Patented May 22, 1951

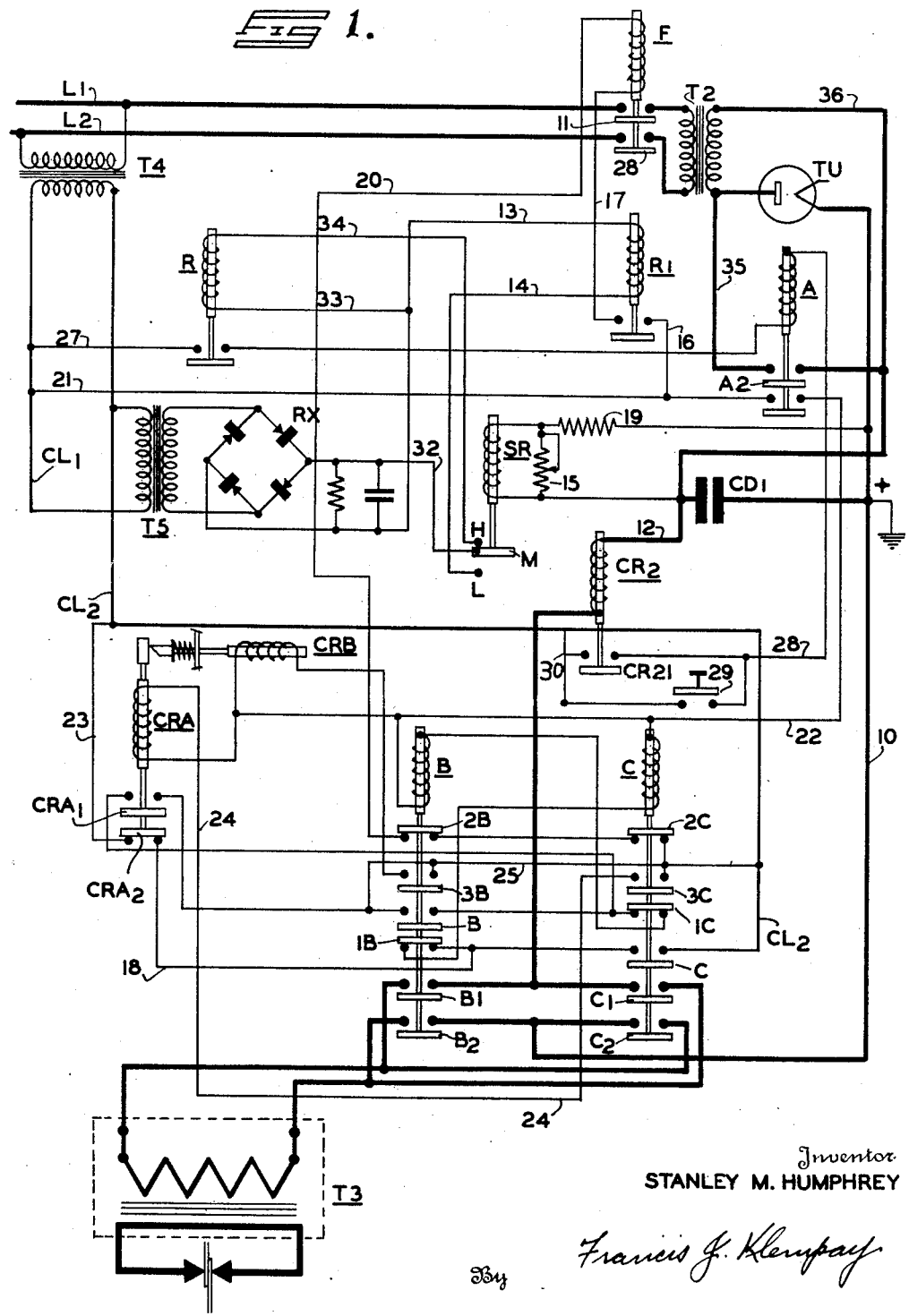

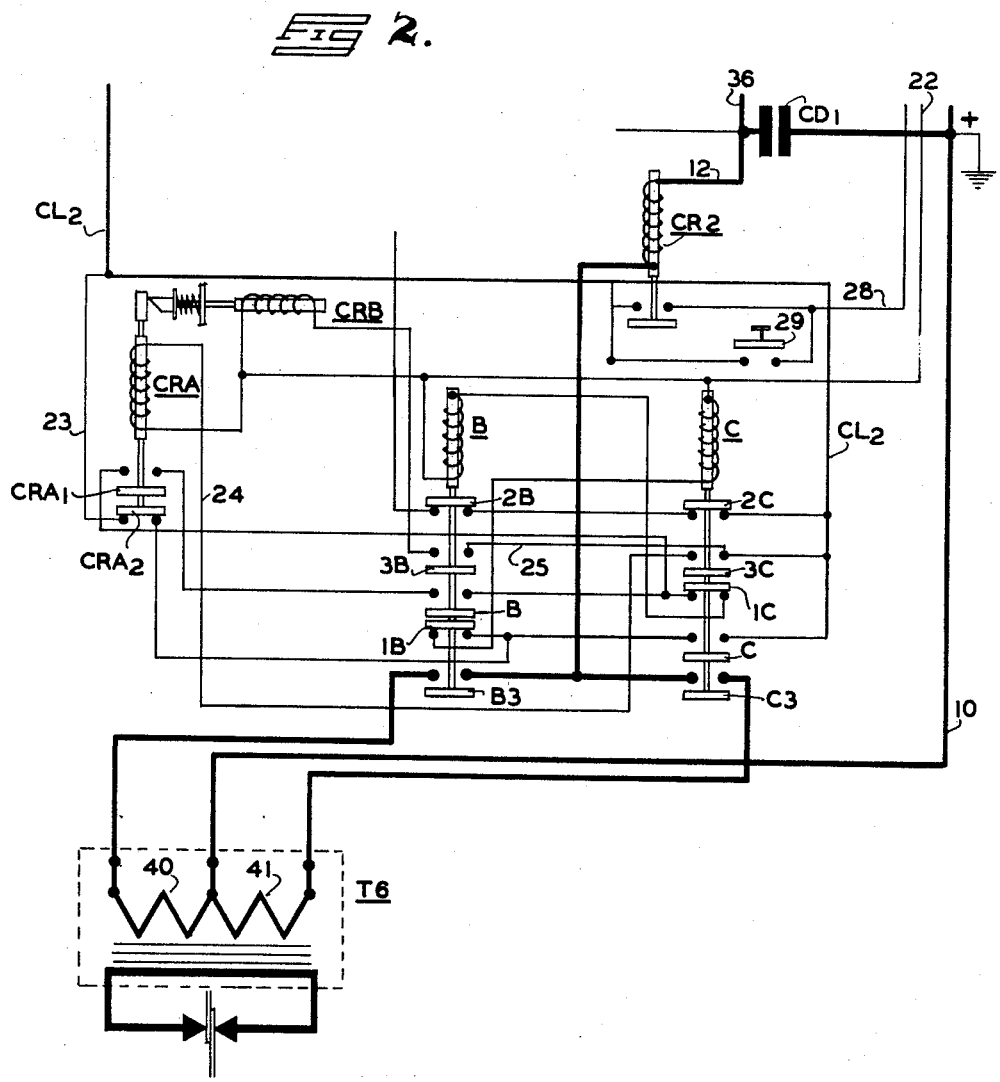

2,553,970

UNITED STATES PATENT OFFICE 2,553,970

WELDING APPARATUS

Stanley M. Humphrey, Warren, Ohio, assignor to The Taylor-Winfield Corporation, Warren, Ohio, a corporation of Ohio Application December 22, 1942, Serial No. 469,805

8 Claims. (Cl. 219—4)

This invention relates to electric welding apparatus of the capacitor discharge type and more particularly to such apparatus in which the capacitor discharge circuit is inductive thereby presenting the essential elements of an oscillatory circuit. The primary object of the present invention is the provision, in a welding system of this nature, of an arrangement whereby oscillation in the discharge circuit is avoided. This insures the uni-directional discharge of the capacitor through the welding load during a desired short interval of time and avoids the impression of damaging voltages of reversed polarity on the capacitor.

The present application is a continuation-in-part of applicant's co-pending application Serial No. 379,084 filed February 15, 1941, for Welding Apparatus, now U. S. Patent No. 2,436,863.

The inductive element of the discharge circuit comprises the primary winding of a transformer and by reason of the very heavy uni-directional surge of current resulting from the discharge of the capacitor the transformer, in systems of this nature, would normally become very quickly saturated thus rendering the translating apparatus substantially inoperative. To avoid this condition another important object of the invention is the provision of an arrangement whereby the charged capacitor is discharged through the welding transformer in alternate directions during each succeeding welding operation. Thus any tendency of the welding transformer to saturate is neutralized and the involved welding system may therefore be operated at a high rate of production and over long periods of time without diminution of efficiency.

The reversal of current flow in the welding transformer may be accomplished either by employing a single section primary winding and reversing the current flow through this winding in each succeeding welding operation or by employing a two-section primary winding connected to the capacitor through suitable switching means which are controlled in such manner that the discharge current flows through opposite sections in each succeeding welding operation and in such direction as to provide effective reversals of the current flow with respect to the core of the transformer. In this embodiment, the required apparatus may be substantially simplified by providing the primary winding of the welding transformer with a center tap which may be permanently connected to one terminal of the capacitor thus providing the two sections mentioned and enabling the outer terminals of these sections to be alternately connected to the opposite terminal of the capacitor with a minimum of apparatus.

The above and other objects and advantages of the invention will become apparent upon a consideration of the following detailed specification and the accompanying drawing wherein there is specifically disclosed certain preferred embodiments of the invention.

In the drawing:

Figure 1 is a wiring diagram of a welding system constructed in accordance with the principles of the invention; and Figure 2 is a wiring diagram of a modified capacitor discharge circuit which may be substituted for the discharge circuit in the system in Figure 1.

Referring first to Figure 1, the line conductors L1 and L2 constitute a suitable source of alternating current arranged to be connected to the primary of the transformer T2 through the contactors 1F and 2F which are actuated by the relay coil F. For a purpose to be later described, the secondary winding of the transformer T2 may be constructed in such manner so as to provide a low impedance path between its output terminals. Also, the transformer T2 is preferably constructed in such manner so as to provide substantial leakage reactance between its primary and secondary windings to thereby limit the current translated.

The principal or power capacitor of the system is indicated by the reference CD1 and the welding transformer of the disclosed system by the reference T3. Current for control purposes is derived from the line L1, L2 through the transformer T4, the conductors CL1 and CL2 being connected to the terminals of the secondary winding of the transformer T4.

The secondary winding of transformer T2 is, in the preferred and illustrated embodiment of the invention permanently connected to the capacitor CD1 through low impedance conductors and the rectifier TU and to provide for the control of the voltage to which the capacitor CD1 is charged a sensitive relay SR is provided, the operating coil of which is in series with the resistance 19 across the terminals of the capacitor CD1. Shunted across the coil is an adjustable resistance 15 which may be adjusted to cause operation of the relay at any predetermined voltage appearing across the capacitor CD1. The circuits controlled by the contacts on the relay S1 are preferably supplied with direct current furnished by a dry disk type of rectifier RX which derives energy from the control current line through the transformer T5. Connected across the output of the rectifier RX through the conductors 13, 14, contacts L and M of relay SR, and conductor 32 is the coil of a relay R1 which is operative, when energized, to close its associated contactor and connect conductor 16 with conductor 17. Thus when the capacitor CD1 is discharged or has not attained the voltage for which resistance 15 has been adjusted the relay R1 is energized.

Coil F is in a circuit leading from conductor CL1 through conductors 21 and 16, contactor of relay R1, conductor 17, and conductor 20 through contactors 2B and 2C to line conductor CL2. Thus upon energization of relay R1, the primary of transformer T2 is connected to the supply line L1, L2 to charge the capacitor CD1. When the voltage on the capacitor reaches its proper value relay SR pulls in thus de-energizing coil F to interrupt the charging operation.

Capacitor CD1 is arranged to be discharged through the primary winding of the transformer T3 through the conductors 10 and 12 in the latter of which is positioned the coil of a relay CR2. As shown in Figure 1, the conductors 10 and 12 are arranged to be connected to alternate terminals of the primary winding of the welding transformer T3 by means of the double pole contactors B1, B2 and C1, C2 of the relays B and C, respectively. Relays B and C are arranged to be alternately actuated in each succeeding welding operation and it should be apparent that upon actuation of relay B, the current flow from capacitor CD1 through the primary winding of transformer T3 is from right to left, as viewed in Figure 1, while actuation of relay C results in current flow in the opposite direction.

To provide for the alternate actuation of the relays B and C in the system illustrated, a relay CRA of the latch type is employed together with a latch release coil CRB. On the armature of the relay CRA is a normally open contactor CRA1 and a normally closed contactor CRA2. On the armature of the relay B are also the normally closed contactors 1B and 2B and the normally open contactors B and 3B. On relay C are also the normally closed contactors 1C and 2C and the normally open contactors C and 3C.

Relay A is energized to initiate the discharge of capacitor CD1 in each welding cycle and, assuming the parts to be positioned as shown in Figure 1—capacitor CD1 being fully charged, the closing of relay A establishes a circuit from conductor CL1 through conductors 21 and 22, coil of relay C, contactors 1B and CRA2, and conductor 23 to conductor CL2. Relay C is energized to discharge capacitor CD1 and relay CRA is energized through conductor 24 and contactor 3C and latches itself in while the holding contactor C on relay C insures continuation of energization of its coil. Upon de-energization of relay A relay C drops out and upon the next succeeding energization of relay A the coil of relay B is energized through conductors 21 and 22, coil of relay B, contactors 1C and CRA1 and conductor 25 to conductor CL2. Relay B is thus energized to discharge capacitor CD1 through the welding transformer T3 but in the opposite direction and coil CRB is energized through contactor 3B and conductor 25 to release relay CRA while holding contactor B insures continuation of energization of its coil upon opening of contactor CRA1. Thus the capacitor CD1 is discharged through the welding transformer in alternate directions during each succeeding welding operation thereby avoiding magnetic saturation of the transformer.

In series with the operating coil of the relay A is a conductor 27 (leading from conductor CL1), the contactor of a relay R, conductor 28, a switch 29, and conductor 30 leading to conductor CL2. Relay R is energized from the output of the rectified power supply RX through conductors 33 and 34, contacts H and M of relay SR so that the capacitor CD1 cannot normally be discharged until it has attained a predetermined voltage. Switch 29 may be either manually actuated or automatically actuated in response to the attainment of certain conditions required for the safe or satisfactory operation of the complete welding system such as welding pressure, for example. Normally, initiation of the complete welding cycle takes place periodically under the control of a timer, not shown, and in this case the switch 29 is closed and opened periodically provided the aforementioned conditions are properly attained.

Shunting the switch 29 is a contactor CR21 so that the relay A will remain energized a sufficient length of time to discharge the capacitor CD1 even though the switch 29 is closed but momentarily, it being observed that the contactor CR21 is actuated and held closed by the current flowing in the conductor 12. As the welding current decreases beyond an effectual value contactor CR21 drops out thereby de-energizing relay A. If desired, suitable time delay apparatus may be employed to delay the opening of relay A after the dropping of contactor CR21. Likewise, if desired or necessary, suitable delaying means may be employed to retard the effect of the opening of relay R so that the energizing circuit for the relay A will not be interrupted during the discharge of capacitor CD1 and the consequent dropping of the voltage thereof.

Upon actuation of either of the relays B or C, the charged capacitor CD1 is connected in series with the inductive primary winding of the welding transformer T3 and normally the constants of this series circuit is such that oscillation tends to occur therein. To prevent this oscillation I employ a rectifier permanently connected across the principal power capacitor to provide a low impedance uni-directional current path in shunt with the capacitor to take the current flow resulting from the inductive reaction of the welding transformer primary thereby avoiding the recharging of the capacitor and insuring the uni-directional discharge of the welding energy through the welding load. This is accomplished, in accordance with certain embodiments of the invention, by permanently connecting the charging rectifier to the capacitor and utilizing this same rectifier for both charging and the aforementioned shunt purposes. In one specific embodiment of the invention the secondary winding of the transformer which furnishes energy for charging the capacitor is constructed for low impedance and in this embodiment functions as one link in the aforementioned uni-directional shunt path. This embodiment is disclosed and claimed in the above mentioned co-pending application. In another specific embodiment of the invention an auxiliary contactor, herein shown at A2, may be employed to close across the charging transformer secondary windings to avoid the requirement of special construction for said winding. As shown, contactor A2 is on relay A so that upon energization of this relay to effect the discharging of the capacitor through the welding load the secondary winding of the charging transformer T2 will be shunted by the low impedance circuit consisting of the conductor 35, contactor A2, and conductor 36. Thus, in this embodiment, the capacitor CD1 is shunted directly by the rectifier (TU) independently of the charging transformer primary winding during the discharging of the capacitor through the welding load. This provides a direct uni-directional low impedance current path in shunt with the capacitor.

In practice, the transformer T2 and the rectifier TU may assume many different forms as will be readily understood by those skilled in the art. Likewise, the capacitor CD1 may be replaced by a number of individual capacitors capable of being selectively connected in multiple to vary the total capacitance of the system.

Figure 2 illustrates a modified discharge circuit for the capacitor CD1. The welding transformer T6 is constructed with a primary winding having two sections 40 and 41 conveniently provided by employing a single center-tapped winding, as shown. This enables one of the conductors leading from the main capacitor, as the conductor 10 for example, to be permanently connected to the winding and allows the use of single pole switching devices to be employed to effect the desired alternate direction of current flow. Thus, on relay B the double pole contactor B1—B2 is replaced by a single pole contactor B3 while a single pole contactor C3 is substituted on the relay C. Conductor 10 is connected to one terminal of each of the sections 40 and 41 while the contactor B3 is operative, upon actuation of relay B, to connect the other terminal of section 40 to the other side of capacitor CD1 through conductor 12. Likewise, contactor C3 is operative, upon actuation of relay C, to connect the other terminal of section 41 to the negative terminal of capacitor CD1 through conductor 12.

Relays B and C, in the modification of Figure 2, are operated alternately in the manner described above in connection with Figure 1, the operating circuit being precisely the same in both embodiments, and it should be apparent that such alternate operation of these relays results in directing the flow of welding current through the transformer T6 in alternate directions in each succeeding welding cycle.

The above described embodiments of the invention should be considered as illustrative only as obviously many changes may be made therein without departing from the spirit or scope of the invention. The invention, therefore, is not to be restricted except insofar as required by the prior state of the art and the scope and extent of the appended claims.

I claim:

1. Welding apparatus comprising in combination a capacitor for storing welding energy, an alternating current source, means to charge said capacitor from said source comprising a transformer having its primary adapted to be connected to said source and its secondary connected to said capacitor through a rectifier, an inductive welding load circuit, means to discharge said capacitor through said load circuit, and means operative upon actuation of said means to discharge to provide a current conductive path in shunt with said secondary whereby during discharge of said capacitor said rectifier and said current conductive path provide a uni-directional current carrying path in shunt with said capacitor.

2. Welding apparatus comprising in combination a capacitor for storing welding energy, an alternating current source, means to charge said capacitor from said source comprising a transformer having its primary adapted to be connected to said source and its secondary connected to said capacitor through a rectifier, an inductive welding load circuit, means to discharge said capacitor through said load circuit, and means operative during discharge of said capacitor to connect said rectifier in shunt with said capacitor whereby during discharge of said capacitor said rectifier provides a direct uni-directional current path in shunt with said capacitor.

3. In an electric welding system of the capacitor discharge type having an inductive welding load circuit arranged to be energized by discharge of the capacitor the combination of means to charge said capacitor comprising a source of alternating current, a rectifier in series with said source and capacitor, means to discharge said capacitor through said circuit, and means operative upon actuation of said means to discharge to provide a current conductive path across said source whereby during discharge of said capacitor said rectifier and current conductive path provide a uni-directional current carrying path in shunt with said capacitor.

4. In an electric welding system of the capacitor discharge type having an inductive welding load circuit arranged to be energized by discharge of the capacitor the combination of means to charge said capacitor comprising a source of alternating current, a rectifier in series with said source and capacitor, and means to prevent oscillation in said load circuit during discharge of said capacitor comprising means providing a low impedance current path including said rectifier in shunt with said capacitor during the discharging of said capacitor.

5. Apparatus of the character described comprising in combination a capacitor, an alternating current source, means to charge said capacitor from said source comprising a rectifier, a load circuit, a transformer having a primary winding adapted to be energized by the discharge of said capacitor and a secondary winding connected to said load circuit, means to discharge said capacitor through said primary winding in alternate directions in succeeding impulses, and means comprising said rectifier to establish a uni-directional current path in shunt with said capacitor to prevent oscillation in the capacitor-primary winding circuit upon discharge of said capacitor.

6. Apparatus of the character described comprising in combination a capacitor, a load circuit, a transformer having a primary winding adapted to be energized by the discharge of said capacitor and a secondary connected to said load circuit, means to discharge said capacitor through said primary winding in alternate directions in succeeding operations, means responsive to the voltage on said capacitor to prevent operation of said discharge means unless said capacitor is charged to a predetermined voltage, and means comprising a rectifier to establish a uni-directional current path in shunt with said capacitor to prevent oscillation in the capacitor-primary winding circuit upon discharge of said capacitor.

7. Apparatus of the character described comprising in combination a capacitor, a load circuit, a transformer having a primary winding adapted to be energized by the discharge of said capacitor and a secondary winding connected to said load circuit, means to discharge said capacitor through said primary winding, means responsive to the voltage on said capacitor to prevent operation of said means to discharge unless said capacitor is charged to a predetermined voltage, and means comprising a rectifier to establish a unidirectional current path in shunt with said capacitor to suppress oscillation in the capacitor discharge circuit.

8. A condenser charging system comprising a condenser, a source of alternating current, a rectifier adapted to charge said condenser, a self-opening relay controlling a connection from said source of said rectifier, means for energizing said relay, and controlled means independent of the rectifier and responsive to the charge on said condenser for deenergizing said relay when the charge on said condenser is above a predetermined level.

STANLEY M. HUMPHREY.

REFERENCES CITED

The following references are of record in the file of this patent:

UNITED STATES PATENTS

| Number | Name | Date |
| --- | --- | --- |
| 2,085,100 | Knowles et al. | June 29, 1937 |
| 2,483,691 | Dawson | Oct. 4, 1949 |